United States Patent [19]
Lehmann

[11] 3,757,112
[45] Sept. 4, 1973

[54] SYSTEM, METHOD AND APPARATUS FOR LOCATING MOVABLE OBJECTS ON A FIXED PATH

[75] Inventor: Roger Lehmann, Paris 14e, France

[73] Assignee: Compagnie Generale D'Automative, Paris, France

[22] Filed: Aug. 17, 1971

[21] Appl. No.: 172,536

[30] Foreign Application Priority Data

Aug. 17, 1970  France .......................... 7030197
May 21, 1971  France .......................... 7118431

[52] U.S. Cl. ................... 246/122 R, 340/146.1 R
[51] Int. Cl. ...................... B61l 25/02, G06f 11/02
[58] Field of Search ............. 340/146.1 C, 146.1 R; 246/122 R

[56] References Cited
UNITED STATES PATENTS

| | | | |
|---|---|---|---|
| 3,005,189 | 10/1961 | O'Brien | 340/146.1 |
| 3,046,523 | 7/1962 | Batley | 340/146.1 |
| 3,069,657 | 12/1962 | Green, Jr. et al. | 340/146.1 C |

OTHER PUBLICATIONS

Encoded Tracks Tell Train Location, Control Engineering, March 1968 p. 54.

*Primary Examiner*—Gerald M. Forlenza
*Assistant Examiner*—George H. Libman
*Attorney*—Richard C. Sughrue, John H. Mion et al.

[57] ABSTRACT

A method and apparatus for locating movable objects on a fixed path. Binary coded markers in a pseudo-random sequence positioned along the path. The sequencing is such that a series of different words are formed, each word indicating the relative position of the movable object. The movable object has a detector for detecting the binary digits of the successive markers. The words formed by the digits are stored in an $m$-stage shift register. Means are included for analyzing the accuracy of the word stored in the shift register. If an error is found, then the word stored in the register is not read out to an indicator which gives the position of the movable object.

14 Claims, 2 Drawing Figures

PATENTED SEP 4 1973

3,757,112

INVENTOR
ROGER LEHMANN

BY Sughrue, Rothwell, Mion, Zinn & Macpeak

ATTORNEYS

SYSTEM, METHOD AND APPARATUS FOR LOCATING MOVABLE OBJECTS ON A FIXED PATH

BACKGROUND OF THE INVENTION

1. Field of the Invention

The present invention relates to a system, method and apparatus for locating movable objects on a fixed path.

2. Description of the Prior Art

It has been proposed to locate a train on a railway track by integrating its speed with respect to time and making periodic adjustments to correct for errors inherent in an integration operation.

For example, markers may be placed along the track and the distance travelled may be calculated from the number of markers passed and the known distance between markers. Furthermore, distinctive beacons may be placed at regular intervals along the track so as to provide reference points from which corrections can be made.

This location method has a number of disadvantages.

The position of the train in terms of its distance from the last beacon must be calculated by counting the number of markers passed since the last beacon. This distance has then to be added to the distance of the last beacon from the starting point.

There is no way of detecting errors in the number of markers counted since the last beacon was passed.

Each beacon must be separately distinctive along the track so that it can be individually recognized and identified. This leads to a high cost of the system.

SUMMARY OF THE INVENTION

According to one aspect of the present invention, there is provided a system for indicating the position of a movable object on a fixed path, comprising: markers arranged along the path to define successive path sections, each marker representing the binary digit 1 or the binary digit 0 and the set of markers defining at least part of a predetermined pseudo-random binary sequence; a detector carried by the movable object for sensing each marker; a register linked to the detector to receive the successive binary digits and to hold them in successive groups of $m$ which are all different and which each signify a respective position of the movable object; circuitry for detecting errors in the $m$-digit groups in accordance with the properties of the pseudo-random sequence; and circuitry for inhibiting indication of a position in response to detection of such an error in the respective $m$-digit group.

According to a second aspect of the present invention there is provided a method for indicating the position of a movable object on a fixed path by arranging markers along the path to define the successive path sections, each marker representing the binary digit 1 or the binary digit 0 and the set of markers defining at least part of a predetermined pseudo-random binary sequence, detecting each marker in the movable object, transferring the successive binary digits to a register in which they are held in successive groups of $m$ which are all different and which each signify a respective position of the movable object, detecting errors in the $m$-digit groups in accordance with the properties of the pseudo-random sequence, and inhibiting indication of a position in response to detection of such an error in the respective $m$-digit group.

According to a third aspect of the present invention there is provided a set of markers for use in indicating the position of a movable object on a fixed path, the markers being arranged along the path to define successive path sections, each marker representing the binary digit 1 or the binary digit 0 and the set of markers defining at least part of a predetermined pseudo-random binary sequence.

According to a fourth aspect of the present invention there is provided apparatus for use in indicating the position of a movable object on a fixed path, comprising a detector carried by the movable object and arranged to sense each of a set of markers arranged along the path to define successive path sections, each marker representing the binary digit 1 or the binary digit 0 and the set of markers defining at least part of a predetermined pseudo-random binary sequence, a register linked to the detector to receive the successive binary digits and to hold them in successive groups of $m$ which are all different and which each signify a respective position of the movable object, circuitry for detecting errors in the $m$-digit groups in accordance with the properties of the pseudo-random sequence, and circuitry for inhibiting indication of a position in response to detection of such an error in the respective $m$-digit groups.

BRIEF DESCRIPTION OF THE DRAWINGS

The invention will be further described by way of example with reference to the accompanying diagrammatic drawings, in which.

DESCRIPTION OF THE PREFERRED EMBODIMENT

Figure 1:
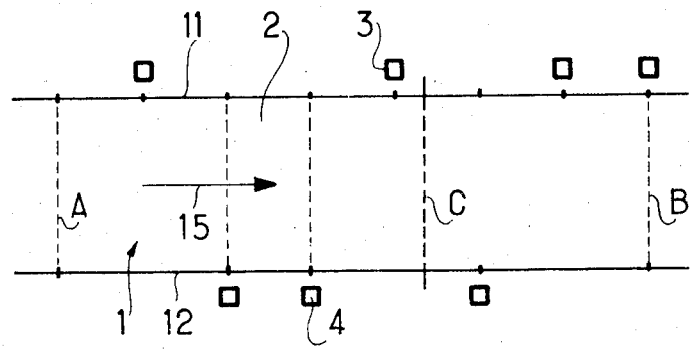
FIG. 1 shows a track along which a train can move.

In FIG. 1, a railway track 1 has rails 11 and 12. The portion of the track lying between the lines A and B is divided into seven sections one of which is indicated at 2. Each section is associated with a marker, one of which is indicated at 3, situated adjacent the rail 11, or with a marker, one of which is indicated at 4, situated adjacent the rail 12. When a train moving in the direction indicated by the arrow 15 passes directly in front of a marker 3, a first bistable circuit of a logic circuit aboard the train passes to state "1." When the train passes directly in front of a marker 4, this bistable circuit passes to state "0." All the markers adjacent the rail 11 correspond to a "0" state and all those adjacent the rail 12 to a "1" state.

The markers define a pseudo-random binary sequence with a recurrence length of 7 binary digits. This sequence is formed by seven consecutive digits continuously repeated, thus:

$$\ldots\ldots 11100101110010 \ldots\ldots$$

Seven possible words of at least three binary digits, the word 000 excluded, are given by each combination of three successive digits in the pseudo-random sequence and are as follows:

$$111, 110, 100, 001, 010, 101, 011.$$

Figure 2:
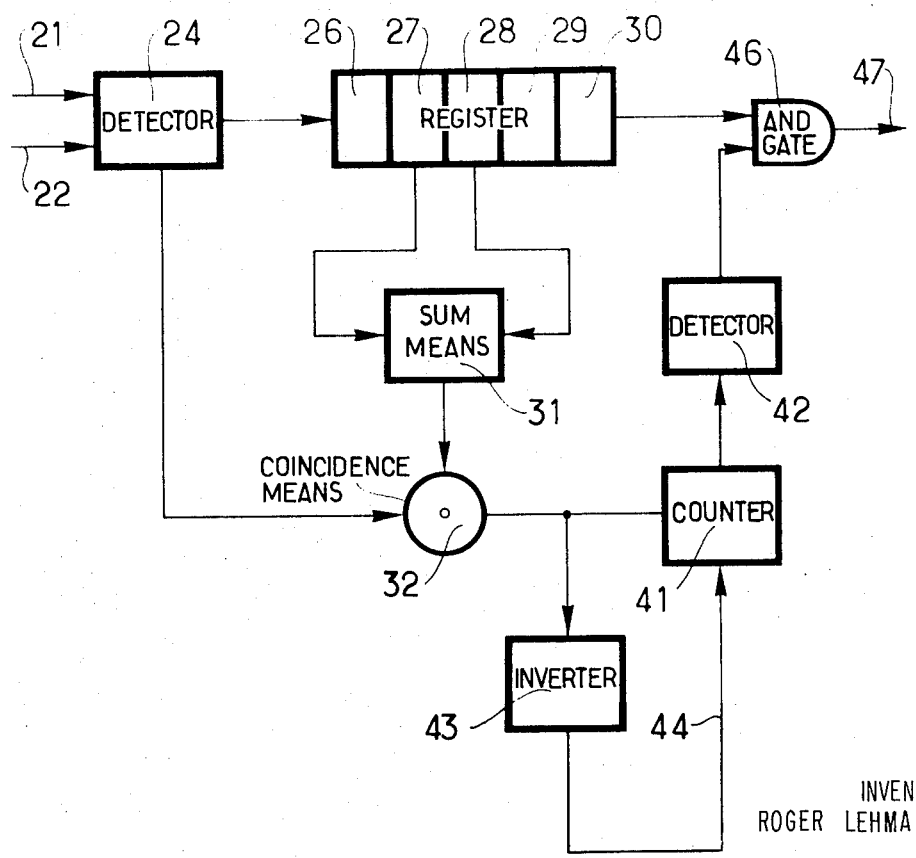
FIG. 2 shows the logic circuit of the preferred embodiment.

In FIG. 2, the information delivered by the markers 3 and 4 is presented at lines 21 and 22 respectively connected to a detection circuit 24 which delivers advance pulses to the first stage of a five-stage shift register 25.

When the train passes directly in front of a marker 3, the first state 26 of the shift register 25 passes to state "1," when the train passes directly in front of a marker 4, the first stage 26 passes to state "0." Each time the train passes directly in front of a marker, the contents of the shift register are advanced by one division, the contents of state 26 being moved into stage 27, and so on.

The words which are successively present in the shift register are:

10111, 01110, 11100, 11001, 10010, 00101, 01011.

In the Figure, the shift is made from left to right but the words are read from right to left.

An exclusive-OR circuit 31 receives on respective first and second inputs the contents of the second and third stages 27 and 28 of the register. This circuit forms the sum modulo 2 of the digits instantaneously in those two stages. The output of the circuit 31 is connected to a first input of a coincidence circuit 32 whose second input is connected to an output of the circuit 24. When the digits at the two inputs of the coincidence circuit 32 are the same, a binary value is delivered at its output. When these digits are different, the opposite binary value is delivered at this output. This latter signal appears as soon as the word contained in the shift register 25 does not correspond to the real position of the train on the portion AB of the track.

By forming the sum modulo 2 of the digits in an appropriate pair of register stages, the sum obtained is identical to the next binary digit to be detected. The stages selected depend on the sequence in use and are stages 27 and 28 in the present example.

Thus at any time, the binary digit obtained from circuit 24 should be identical to the output of circuit 31 if the process is proceeding correctly.

When the register 25 contains the word 11001, corresponding to its passage in the section C, a state "0" corresponding to the next binary figure which the detector must read is seen at the output of circuit 31, both register stages 27 and 28 being at state "0." Thus in this case there is no error. If there is an error, the circuit 24 detecting for example the passage in front of a marker 3, a "1" appears at the output of the circuit 24. This is transmitted to the coincidence circuit 32, which already has the expected binary "0" on its second input. Thus non-coincidence is detected. The circuit 32 is able to detect non-coincidences from the markers along the track and also from the detector circuit 24. It detects all errors which are presented at the input of or which may arise in the shift register.

In the example, the number ($m$) of digits in each word was taken equal to 5 and the minimum number ($n$) of binary digits of a word such that all the words taken in a sequence are different is 3. The difference $k = m - n$ is the number of binary figures whose parity is dependent on the $m$ binary digits of the word.

In this example $k = 2$ the coincidence circuit 32 is connected to a counting device 41 which can count up to $k$. If $k$ comparisons have shown that all the $k$ binary digits present at the input of the register were the same as the respective $k$ binary digits elaborated by the circuit 31, a numerical threshold detector 42 delivers a binary signal which opens an AND gate 46 to authorize transmission of the contents of the shift register to a utilization means. The position of the train can then be read off.

If during the course of the previously mentioned $k$ comparisons, one of the binary digits present at the input of the shift circuit was different from the respective binary digit elaborated at the same moment by circuit 31, the coincidence circuit delivers a signal to an inverter 43 whose output resets the counter 41 to zero. In this case, the detector 42 delivers a binary signal which closes gate 46.

Alternatively the signal delivered by 32 may be used to reset the stages of the register to zero. It should be noted that when there is an error, the coincidence circuit 32 respects the principle of negative security.

The device just described allows errors to be detected with a high degree of probability. It is known that if "$d$" is the HAMMING distance between the words, it is possible to detect at the most $e = (d - 1)$ errors per word. Consequently, if no error has been detected during the $k$ successive comparisons, two situations may exist:

1. There may be no error among the $m$ binary figures of the word considered; or
2. There may be more than $(d - 1)$ errors, as if there were less they would have been detected.

A probability calculation giving the probability of having $(d - 1)$ errors or more among $m = n + k$ binary figures shows that this probability is very small. For example, if $n = 15$, $k = 25$ and $d = 16$ the probability that the contents of the shift register are correct is approximately 1, to one part in $10^{20}$.

This probability calculation also shows that the choice of $k$ depends on the threshold of probability of error that has been fixed as acceptable.

The minimum HAMMING distance between two words depends on the choice of stages of the register whose sum modulo 2 is made by means of the circuit 31.

To take a numerical example, with a track 30,000 metres long and where the position of a train is to be known to within $p$ metres, the track is divided into intervals each of a length less than or equal to $p$ metres and a sequence is arranged along the track of at least 30,000/$p$ binary digits. Thus, if the position of the train is to be known to within 10 metres, the track is marked with at least 3,000 markers disposed on either side of the track so as to correspond to a pseudo-random sequence of at least 3,000 binary digits.

Taking, in this case, the definition of each position of the train to be given by a word of at least $n = 12$ binary digits, it is found that this leads to the use of a shortest possible sequence of 4,095 digits. Therefore, either a complete sequence can be laid out along the track with at least 4,095 markers, in which case the position of the train is known to an accuracy better than 10 meters, or the accuracy of detection can be held at 10 meters in which case only 3,000 successive markers of the full sequence must be laid out.

From the practical point of view it is preferably to install along the track, rather than an assembly of markers, a continuous conductor arranged to transmit, to the detector circuit 24, a binary series identical to that defined by the markers. This mode of operation has the advantage of being continuous in the sense that the link between the logic assembly on the train and the transmitting circuit is continuous.

The sequences discussed may have fixed distance between the markers. The locating is effected by the knowledge of the word in the register, however, and there is therefore nothing to prevent a variable distance being used. This is particularly useful when it is necessary to take into account bends in the track, difficult terrain or the presence of a station.

The present invention has been exemplified in connection with the positioning of a train on a track. There are many other applications, in the field of handling objects on a conveyor, for example.

While in the example just described the register, the error detection circuitry and the inhibition circuitry are carried on the movable object with the detector, they may be located at a fixed station and appropriately linked to the movable article.

While the invention has been particularly shown and described with reference to the preferred embodiment thereof, it will be understood by those skilled in the art that various changes in form and details may be made therein without departing from the spirit and scope of the invention.

I claim:

1. A system for indicating the position of a movable object on a fixed path, comprising:
   a. markers arranged along the path to define successive path sections, each marker representing the binary digit 1 or the binary digit 0 such that the set of markers define at least part of a predetermined pseudo-random binary sequence;
   b. a detector carried by the movable object for sensing each marker;
   c. register means coupled to the detector to receive the successive binary digits and store them in successive groups of $m$ digits, the groups all being different, and each group signifying a respective position of the movable object along the path;
   d. error detection means for detecting errors in the $m$ digit groups in accordance with the properties of the pseudo-random sequence, said error detection means including:
      sum means for providing the sum modulo (2) of at least two preselected binary digits in each $m$ digit group;
      coincidence means for receiving at least one output of the detector and at least one output of the sum means;
      a counter means for counting successive coincidences in the coincidence means;
      non-coincidence indication means for resetting the counter means to a start configuration;
      numerical threshold detector means coupled to the counter for providing an indication that a predetermined number $k$ of successive coincidences have been received by the counter means, $k$ being the difference between $m$ and the minimum number of $n$ of binary digits with which $n$ digit groups can be formed from the binary sequence without duplication; and
   e. inhibiting means for inhibiting the indication of a position in response to detection of an error in the respective $m$ digit group by the error detection means.

2. A system as claimed in claim 1 wherein the inhibiting means includes an output gate for reading out the digits stored in the register means, the gate being operated by the output from the threshold detector means when $k$ successive coincidences have been obtained.

3. A system as claimed in claim 2 wherein the register means, the error detection means and the inhibiting means are positioned on the movable object.

4. A system as claimed in claim 3 wherein the register means, the error detection means and the inhibiting means are positioned at a fixed station and the register means is linked to the detector positioned on the movable object.

5. A method for indicating the position of a movable object on a fixed path comprising the steps of:
   a. arranging markers along the path to define successive path sections, each marker representing the binary digit 1 or the binary digit 0 and the set of markers defining at least part of a predetermined psuedo-random binary sequence;
   b. detecting the binary digit associated with each marker; transferring the successive binary digits to a register in which they are stored in successive groups of $m$ digits each group being different and signifying a respective position of the movable object;
   c. detecting errors in the $m$ digit groups in accordance with the properties of the pseudo-random sequence, wherein errors in the $m$ digit groups are detected by:
      providing the sum modulo (2) of at least two preselected binary digits in each $m$ digit group;
      counting successive coincidences between the sum modulo (2) and the detection of a marker; indicating a non-coincidence between the sum and the detection of a marker; restarting the count on each non-coincidence;
      providing an enabling indication when a predetermined number $k$ of successive coincidences has been obtained, $k$ being the difference between $m$ and the minimum number $n$ of binary digits with which $n$ digit groups can be formed from the binary sequence without duplication; and
   d. inhibiting an indication of a position in response to detection of an error in the respective $m$ digit group.

6. A method as claimed in claim 5 wherein the digits stored in the register are read out when $k$ successive coincidences have been obtained.

7. Apparatus for use in indicating the position of a movable object on a fixed path, comprising:
   a. a detector carried by the movable object and arranged to sense each of a set of markers arranged along the path to define successive path sections, each marker representing the binary digit 1 or the binary digit 0 and the set of markers defining at least part of a predetermined pseudo-random binary sequence;
   b. a register means coupled to the detector to receive the successive binary digits and to store them in successive groups of $m$ digits, the groups all being different and each signifying a respective position of the movable object;
   c. error detection means for detecting errors in the $m$ digit groups in accordance with the properties of the pseudo-random sequence, the error detection means including:
      sum means for providing the sum modulo (2) of at least two preselected binary digits in each $m$ digit group;
      coincidence means for receiving an output of the detector and the output of the sum means;

a counter means for counting successive coincidences in the coincidence means;

non-coincidence indication means for resetting the counter means to a start configuration;

numerical threshold detector means coupled to the counter for providing an indication that a predetermined number $k$ of successive coincidences have been received by the counter means, $k$ being the difference between $m$ and the ninimum number $n$ of binary digits with which $n$ digit groups can be formed from the binary sequence without duplication; and d. inhibiting means for inhibiting the indication of a position in response to detection of an error in the respective $m$ digit group by the error detection means.

8. A system as claimed in claim 6 wherein the inhibiting means includes an output gate for reading out the digits stored in the register means, the gate being operated by the output from the threshold detector means when $k$ successive coincidences have been obtained.

9. Apparatus as claimed in claim 8 wherein the register means, the error detection means and the inhibiting means are positioned in the movable object.

10. Apparatus as claimed in claim 8 wherein the register means, the error detection means and the inhibiting means are positioned at a fixed station and the register means are linked to the detector positioned on the movable object.

11. A system for locating a movable object on a given path, comprising:

a. means arranged along the path and dividing it into N stages, said means representing the binary digits 0 and 1, the sequence of said binary digits along the path defining at least part of a pseudo-random sequence of maximal length;

b. detection means on said movable object for successively detecting each of said binary digits of said sequence;

c. recording means coupled to said detection means for recording the successive detected binary digits in words of $m$ binary digits, $m$ being so chosen that all the words recorded are different, each of said words being representative of a position of the movable object on the path;

d. analyzing means coupled to said detection means and said recording means for analyzing the accuracy of a recorded word, said analyzing means comprising:

coincidence means having a first input connected to said detector means and a second input connected to a sum means for effecting the sum modulo (2) of at least two binary digits present in said recording means;

counting means connected to said coincidence means to count the number of successive coincidences;

non-coincidence means for resetting said counting means to zero upon occurrence of a non-coincidence between said sum means and said detector means;

a numerical threshold detector means connected to the counter means for providing a signal when the count in the counter is at least equal to $k$ where $k$ is the difference between $m$ and the minimum number of binary digits in each different word; and e. inhibiting means for inhibiting the read out of a recorded word when it is inaccurate.

12. A system according to claim 11 wherein said inhibiting means comprises a gate whose inputs are connected to the outputs of said recording means and said threshold detector means.

13. A system according to claim 12 wherein after an occurrence of an error in at least one binary digit, said inhibiting means is only reopened when said recording means becomes synchronized with the pseudo-random sequence established along said path.

14. A system according to claim 13 wherein said inhibiting means is only opened initially when said recording means becomes synchronized with the pseudo-random sequence established along said path.

* * * * *